(12) United States Patent
Barwick

(10) Patent No.: US 6,394,240 B1
(45) Date of Patent: May 28, 2002

(54) VEHICLE ROLL DAMPING

(75) Inventor: Stephen Richard Barwick, Buckingham (GB)

(73) Assignee: Rover Group Limited, Warwick (GB)

( * ) Notice: Subject to any disclaimer, the term of this patent is extended or adjusted under 35 U.S.C. 154(b) by 0 days.

(21) Appl. No.: 09/234,180

(22) Filed: Jan. 20, 1999

(30) Foreign Application Priority Data

Jan. 29, 1998 (GB) ............................................. 9801780

(51) Int. Cl.⁷ .................................................. F16F 9/12
(52) U.S. Cl. ...................................... 188/296; 188/293
(58) Field of Search ................................ 188/293, 296, 188/307, 306, 308, 309, 310

(56) References Cited

U.S. PATENT DOCUMENTS

| | | | | |
|---|---|---|---|---|
| 2,027,423 A | * | 1/1936 | Gardiner ..................... | 188/308 |
| 3,085,817 A | | 4/1963 | Krause et al. .............. | 280/124 |
| 4,768,630 A | | 9/1988 | Aubry et al. | |
| 4,908,905 A | | 3/1990 | Kannyo et al. ............. | 188/290 |
| 5,161,822 A | | 11/1992 | Lund .......................... | 280/772 |
| 5,305,855 A | * | 4/1994 | Haga et al. ................. | 188/307 |
| 5,575,502 A | | 11/1996 | Oppitz et al. | |
| 5,601,165 A | | 2/1997 | Oppitz et al. | |
| 5,700,027 A | | 12/1997 | Schiffler | |
| 5,791,444 A | * | 8/1998 | Schiffler .................... | 188/296 |

FOREIGN PATENT DOCUMENTS

| | | |
|---|---|---|
| DE | 26 29 816 | 1/1978 |
| DE | 37 23 239 A1 | 2/1989 |
| DE | 43 37 768 C1 | 2/1995 |
| EP | 0524607 A1 | 7/1992 |
| EP | 0 524 607 A1 | 1/1993 |
| FR | 1254827 | 4/1960 |
| FR | 2 623 754 | 6/1989 |
| GB | 301870 | 11/1928 |
| GB | 477817 | 1/1938 |
| GB | 1 488 390 | 10/1977 |
| GB | 2 212 770 | 8/1989 |
| GB | 2275661 | 2/1994 |
| GB | 2 275 661 | 9/1994 |
| JP | 3-186424 | 8/1991 |
| WO | WO 93/04884 | 3/1993 |

OTHER PUBLICATIONS

Japanese Abstract, vol. 015, No. 437 (M–1176) dated Nov. 7, 1991 to Mazda Motor Corp (JP 03 182832A).
Japanese Abstract, vol. 016, No. 002 (M–1197) dated Jan. 7, 1992 to Mazda Motor Corp (JP 03 227713 A).

* cited by examiner

Primary Examiner—Matthew C. Graham
(74) Attorney, Agent, or Firm—Davis & Bujold, P.L.L.C.

(57) ABSTRACT

A hydraulic rotary roll damper for a motor vehicle is mounted concentrically about an anti-roll bar 4 and coupled to the ends of the anti-roll bar 4 by tubing 7, 8. The damper includes a stack of stator plates 18 mounted on a stator housing member 10 and rotor plates 19 mounted on a rotor housing member 11. The rotor plates 19 are each located within a recess of one of the stator plates 18, and side plates 18a between the stator plates 18 cooperate with the stator plates 18 so as to form a series of cavities 50 each divided into working chambers 52, 54 by one of the rotor plates 19. A varying width passage 25 or a valve 62 and piping 60 are provided to decrease the damping with increasing axle articulation.

21 Claims, 4 Drawing Sheets

VEHICLE ROLL DAMPING

FIELD OF THE INVENTION

The present invention relates to a roll damper arrangement for a motor vehicle.

BACKGROUND OF THE INVENTION

It is known, for example from GB 2275661 to provide a rotary damper operating between the two halves of a split anti-roll bar so as to damp roll movements of a vehicle. However this type of arrangement can have disadvantages, particularly for off-road vehicles where large degrees of axle articulation are required and a high degree of roll damping, which is desirable on-road, can reduce the ability of the axles to articulate as required.

SUMMARY OF THE INVENTION

It is therefore an aim of the present invention to provide a roll control system which can provide the roll control required on-road and the articulation required off-road.

Accordingly the present invention provides a roll damper apparatus for a motor vehicle having two wheels on opposite sides thereof, the apparatus comprising a first member defining a cavity and a second member located within said cavity to divide the cavity into two chambers, wherein at least one passage is defined between the chambers, the cavity contains fluid, and the first and second members are connected between said wheels such that roll of the vehicle will cause movement of the second member relative to the first, such movement being damped by the flow of fluid through said at least one passage, the second member having a central position corresponding to a level condition of the wheels, and said at least one passage being arranged to increase in effective cross sectional area as the second member moves to either side of the central position such that roll damping decreases.

The increase in effective cross sectional area can be achieved by increasing the cross sectional area of at least one of the passages, or by increasing the number of said passages which are open, or both.

It can also be a problem with current systems which include anti-roll bars and roll dampers that the packaging is difficult. It is therefore a further aim of the present invention to provide such a system which is relatively compact.

Accordingly the present invention further provides a roll control apparatus for a vehicle having two wheels on opposite sides thereof of, the apparatus comprising an anti-roll torsion bar connected between said wheels so as to produce torsional resistance to roll movement of the vehicle, and a damper comprising a stator defining a cavity and a rotor located within said cavity to divide the cavity into two chambers, wherein a passage is defined between the chambers, the cavity contains fluid, such movement being damped by the flow of fluid through the passage, and the rotor and stator are mounted around the torsion bar and connected to the wheels via connecting means so that they provide damping resistance to vehicle roll in parallel to the torsional resistance of the torsion bar.

It can be a problem with known rotary dampers, such as that shown in EP 0 524 607 that air in the working chambers can build up, affecting the damping characteristics.

The present invention further provides a roll damper apparatus for a motor vehicle having two wheels on opposite sides thereof movable into and out of a level condition, the apparatus comprising a first member defining a cavity and a second member located within said cavity to divide the cavity into two chambers, wherein a passage is defined between the chambers, the cavity contains fluid, and the first and second members are connected between the wheels such that vehicle roll will cause movement of the second member relative to the first, such movement being damped by the flow of fluid through the passage, the second member having a central position corresponding to the level condition of the wheels, wherein the first member at least partly defines a bleed path arranged to allow bleeding of at least one of fluid and air out of the cavity, the bleed path opening into the cavity at a point aligned with the central position of the second member.

This allows the provision of a bleed path which does not adversely affect the characteristics of the damper.

The present invention also aims to provide a damper which is cheap and simple to manufacture.

Accordingly the present invention still further provides a roll damper apparatus for a motor vehicle having two wheels on opposite sides thereof, the apparatus comprising a plurality of stator members each at least partly defining a respective cavity and a plurality of rotor members each located within a respective one of said cavities to divide it into a pair of chambers, wherein a passage is defined between each pair of chambers, the cavities contain fluid, and the rotor and stator members are connected to said wheels such that vehicle roll will cause movement of the rotors relative to the stators, such movement being damped by the flow of fluid through the passages, wherein the apparatus further comprises support members and a spring and the rotor and stator members comprise plates slidably mounted on the support members and clamped in position by means of the spring.

DESCRIPTION OF PREFERRED EMBODIMENTS OF THE INVENTION

Figure 1:
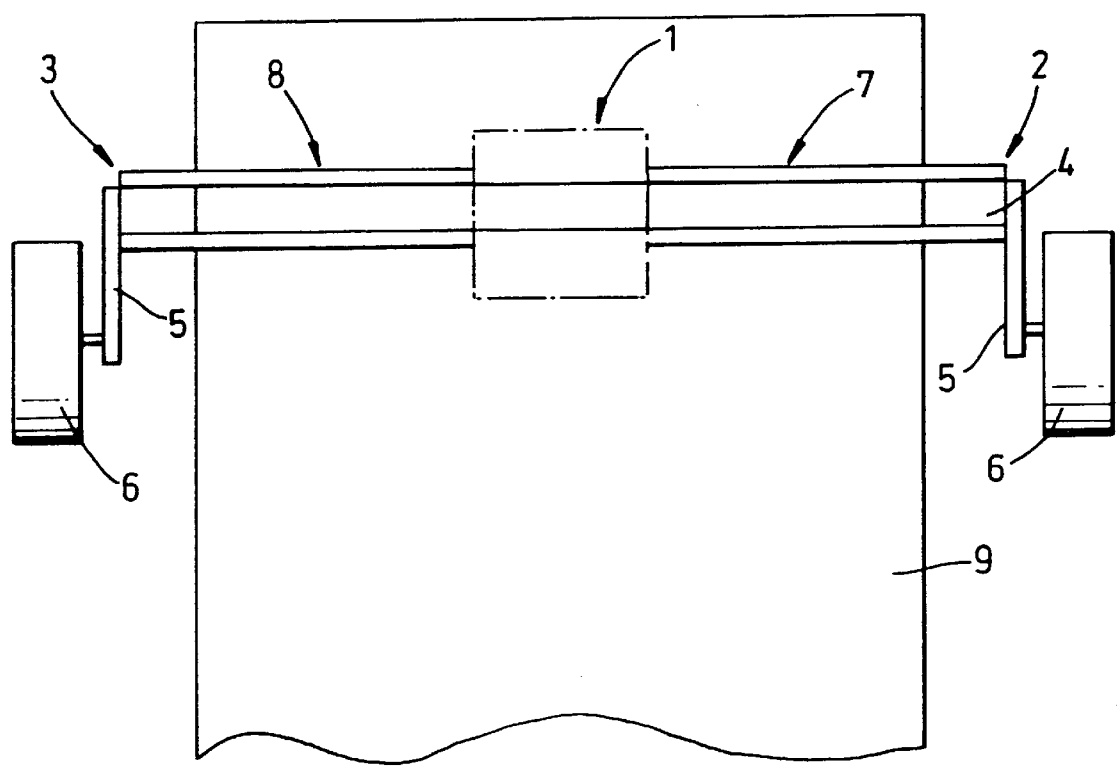
FIG. 1 is a schematic plan view of a roll control apparatus according to the invention.

Referring to FIG. 1, a vehicle roll control system comprises an anti-roll torsion bar 4 mounted on the vehicle body 9 and connected via cranks 5 to two wheels 6 on opposite sides of the vehicle so that vehicle roll, i.e. movement of the two wheels 6 in opposite vertical directions relative to the body, causes twisting of the torsion bar. A hydraulic rotary roll damper 1 is mounted so that it fits round the torsion bar 4, and is connected to the cranks 5 by respective tubes 7, 8 which are coaxial with, and surround, the torsion bar 4. The function of these tubes 7, 8 is to fix in rotation the two sides of the roll damper 1 with the respective cranks 5. It will be appreciated that other arrangements, such as one or more bars running parallel to the torsion bar 4 and rigidly connected to the roll damper 1 and the cranks 5, could be used instead.

Figure 2:
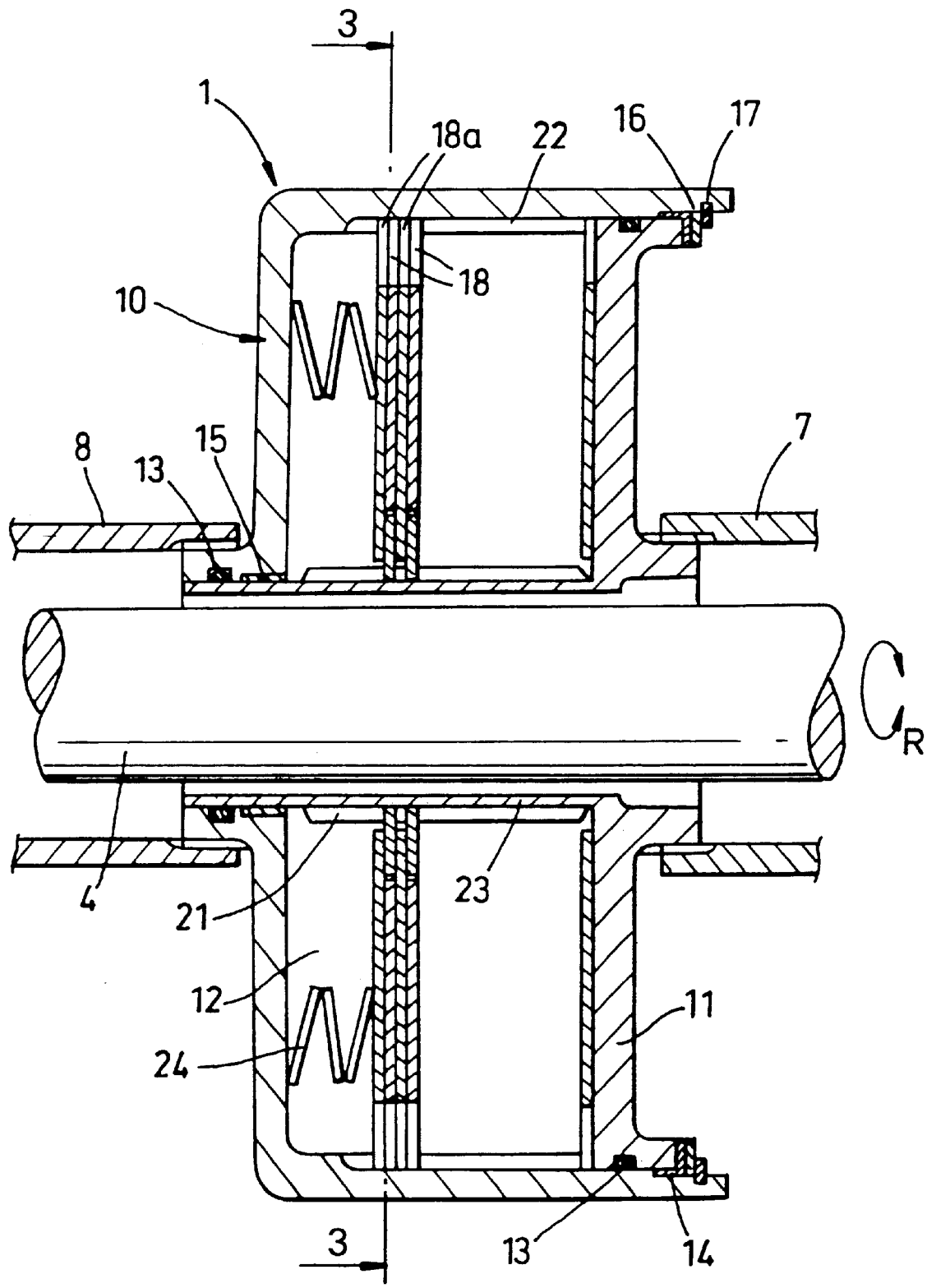
FIG. 2 is a cut-away longitudinal section through a roll damper forming part of the apparatus of FIG. 1.
Figure 3:
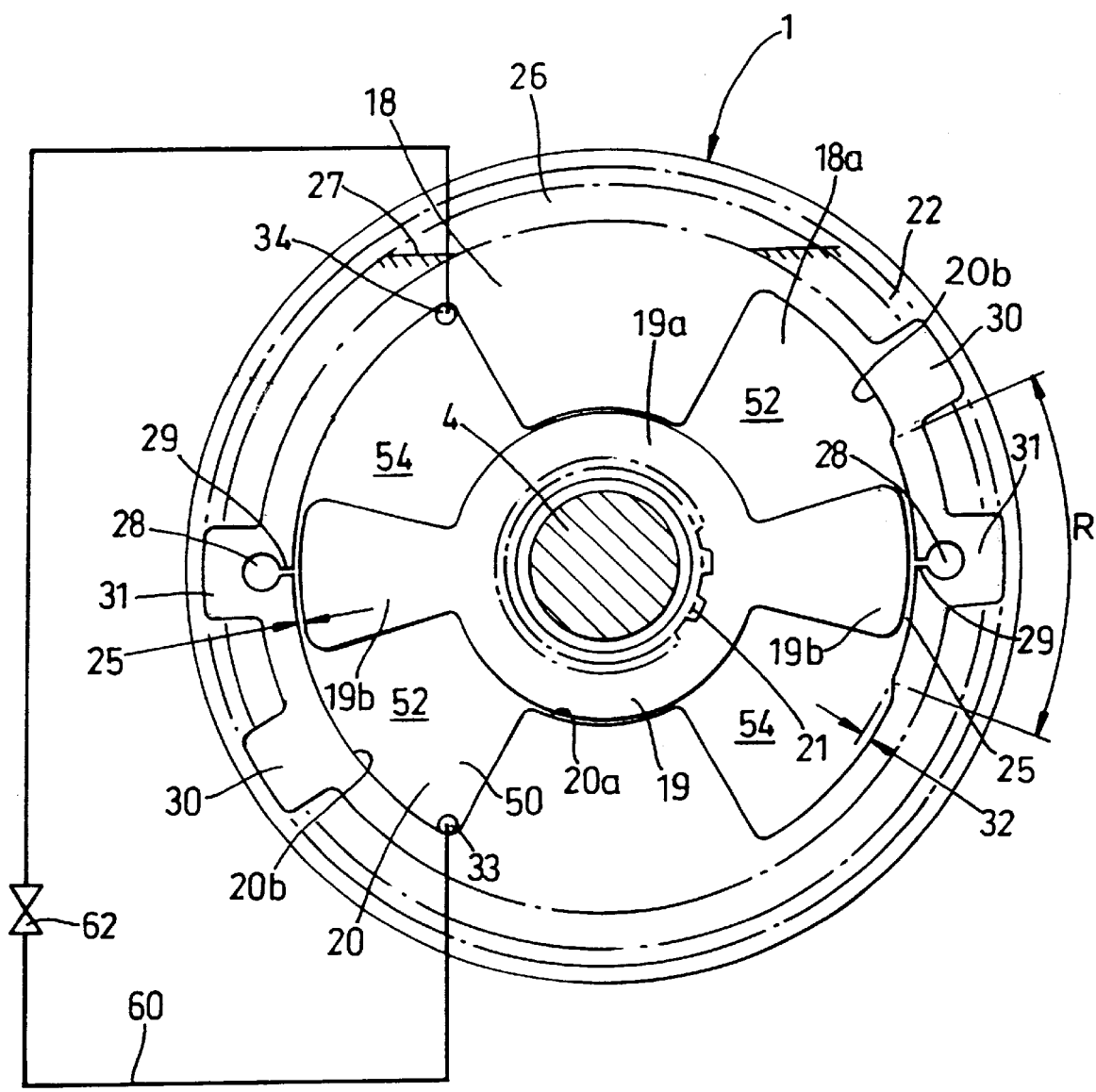
FIG. 3 is a cross-section through the damper arrangement illustrated in FIG. 2 in the plane 3—3, showing on each side a different arrangement for varying the damping.

Referring to FIGS. 2 and 3 the damper 1 comprises a stator housing member 10 which is secured to the tube 8 and a rotor housing member 11 secured to tube 7. The housing members 10, 11 combine through seals 13 and bearings 14, 15 to create a cavity 12 which is of annual cross section, the stator housing member 10 forming the outer wall and one end wall, and the rotor housing member forming the other end wall and the inner wall. This cavity is filled with hydraulic fluid. The assembly of stator member 10 and rotor member 11 is secured with a washer 16 and circlip 17, and relative rotation between the housing members 10, 11 is allowed through bearings 14, 15. However, this rotation R is controlled by stator plates 18 and rotor plates 19 mounted on the stator housing member 10 and rotor housing member respectively, as will be described below. It will be noted that the anti-roll bar 4 is located such that the damper arrangement 1 and tubes 7, 8 are located concentrically about it. In order to maximize rotation of the rotor plates 19 relative to the stator plates 18 for a given amount of articulation, the tubes 7, 8 are connected to the cranks 5 so as to be fixed in rotation with the outer ends of the anti-roll bar 4.

A stack of stator plates 18 and side plates 18a are mounted in the stator housing member 10. Their outer edges are locked in rotation with the stator housing member by means of splines 22, the inner edges of the side plates 18a are just clear of the inner wall of the rotor housing element 11 so that they can rotate relative to it. The stator plates 18 each have an aperture 20 stamped through them which comprises a central circular part 20a for fitting round the rotor housing member 11, and two arcuate parts 20b, on opposite sides of the center. The side plates 18a also have a central circular aperture, but not the arcuate parts of the aperture. Therefore, with the stator plates and side plates stacked alternately, the arcuate parts 20b of the apertures 20 form a number of pairs of cavities 50 each cavity being closed on either side by the side plates 18a. A number of rotor plates 19, which are equal in thickness to the stator plates 18, are mounted on the rotor housing member 11 by means of splines 21 on the sleeve part 23 of the rotor housing member 11. Each rotor plate 19 has a central annular portion 19a, which fits around the sleeve 23 and fits against the inner edge of one of the stator plates 18, and a pair of radially extending blades 19b each of which extends into a respective one of the cavities 50 and has a curved outer end arranged to follow the outer edge of the cavity as it rotates. Each rotor blade 19b therefore divides each of the cavities 50 into two chambers 52, 54. A gap between the tip of each rotor blade 19b and the associated stator plate 18 forms a passage 25 through which hydraulic fluid can flow between the two chambers 52, 54. The effective cross sectional area, or width, of this passage 25 will define the damping provided by the damper, and is arranged to vary with the position of the rotor relative to the stator as will be described below. The damper 1 is connected to the tubes 7, 8, cranks 5 and wheels 6 such that, when the wheels are in a level condition, i.e. at equal vertical displacements relative to the vehicle body 9, the rotor blades 19b are centrally located in the cavities 50, half way between their ends, the chambers 52, 54 being of equal volume.

It will be understood that the plates must be compressed together in the axial direction so that the chambers 52, 54 remain relatively fluid-tight. This compressive engagement is provided by a spring 24 acting between the stator housing member 10 and one end of the stack of plates, the other end of the stack resting against the rotor housing member 11.

In order to reduce friction and wear within the damper arrangement 1 the rotor plates 19, side plates 18a and stator plates 18 can be coated with a PTFE or similar low-friction coating.

In use the torsion bar 4 acts as a conventional anti-roll bar, and the damper 1 acts in parallel with it so that the relative vertical movement of the wheels 6 is resisted by both the resilience of the torsion bar and by the damping of the damper 1. If the tubes 7, 8 are substantially rigid, then they and the damper 1 will provide substantially only a damping effect. However, if the tubes 7, 8 are made torsionally flexible then they can act as a further anti-roll torsion bar operating in series with the damper 1. This would make little difference for low frequency wheel movements where the damping resistance is low and the damper effectively decouples the two tubes 7, 8 from each other. However at higher frequencies, where the damper provides high resistance and tends to lock the tubes 7, 8 together, the increased flexibility in the tubes 7, 8 would reduce the harshness of the system.

The viscosity of the hydraulic fluid in the damper will be one factor determining the damping rate, and normally a relatively low viscosity damping oil will be used to ensure that the variation in viscosity with temperature is not significant. However, it will be understood that the fluid will expand and so an air gap 26 is normally retained within the cavity 12 formed by the stator member 10 and the rotor member 11. Thus, the fluid will have a level 27 within the damper arrangement 1. As an alternative it will be appreciated that an expansion tank type system could be used with an appropriate bleed port into the cavity 12. It will also be appreciated that gas or air pockets within the damper arrangement 1 could significantly alter its performance. Such air pockets could be created when a fluid is put into the damper arrangement 1 or as a result of rotor-induced cavitation.

In order to remove any air pockets within the cavities 12, a conduit is provided through the stator assembly formed by aligned apertures 28 through the stator plates 18 and side plates 18a. Each stator plate 18 further incorporates a balance bleed port 29 leading radially outwards from the cavity 50 to the conduit. This balance port 29 is located such that it is aligned with the center of the rotor blade 19b when the rotor blade 19b is in its central position, i.e. when the torsion bar 4 is in a relaxed state and the vehicle is level. When the rotor 11 rotates relative to the stator 10 so the fluid passes through the passage 25 air in the pressurized hydraulic fluid will tend to move towards the passage 25 as the point of lowest pressure. Once within the passage 25 the pressurized bubble of air or gas will preferentially pass along the port 29 and into the conduit formed by apertures 28. Thus, the cavity 50 is substantially purged of air/gas bubbles. There is a slight loss of fluid pressure into the conduit through the port 29 but by accurate control of the port dimensions this reduction in fluid pressure, and so the performance of the damper 1 can be controlled. Once air/gas is within the conduit it will be appreciated that the general flow dynamics within the damper 1 will lead the air/gas into the main volume of the cavity 12 and so away from the operational chambers 52, 54 of the arrangement 1.

In FIG. 3 the stator plates 18 are illustrated with spline fingers 30, 31. However, it would be normal to provide a significantly larger number of spline fingers for engagement within the spline grooves 22 in order to locate the respective plates of the damper 1. Most of the spline fingers 30 of each stator plate 18 are single protrusions which engage the spline grooves 22, but two of the spline fingers 31 incorporate the apertures 28 and port 29 for air/gas purging from the divided cavity 50 of a stator plate 18. The spline fingers 30, 31 are placed to allow for fluid and air movement from the conduit purging arrangement previously described.

Figure 4:
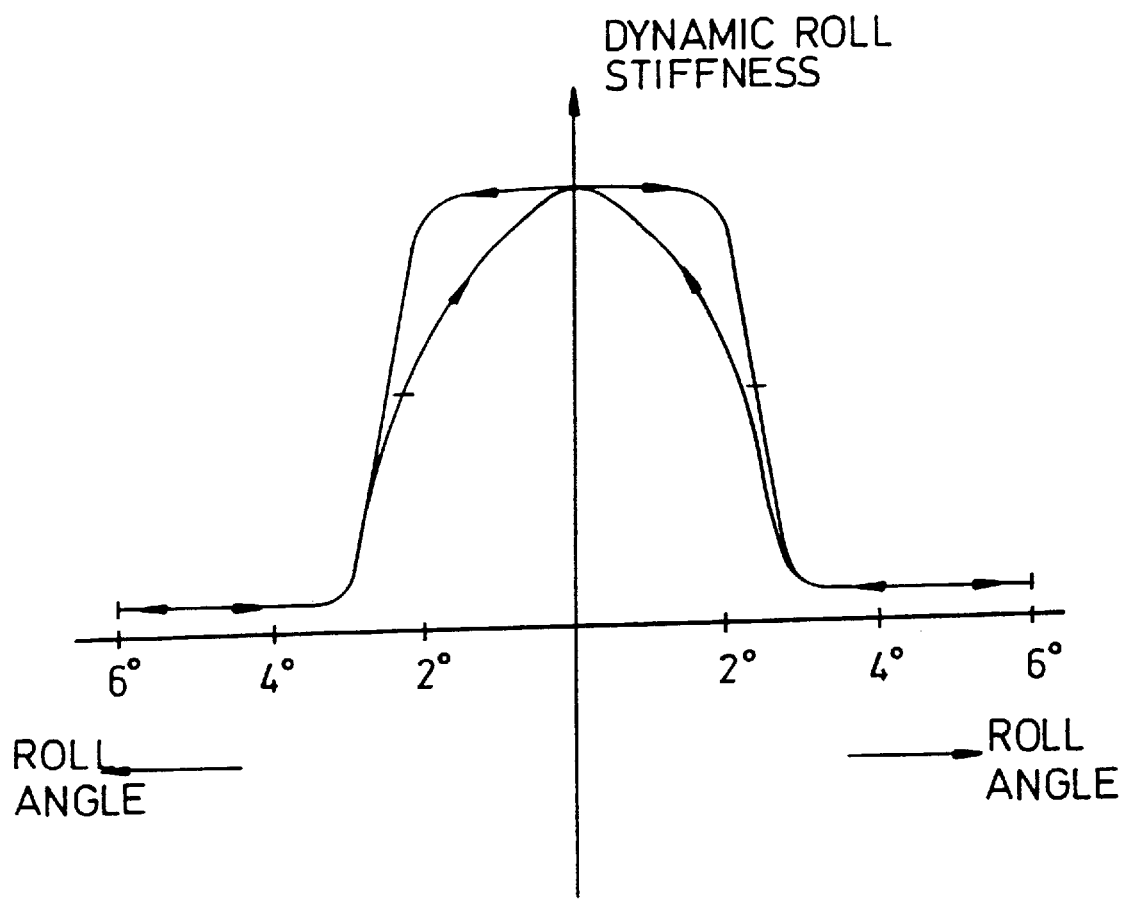
FIG. 4 shows a graph of roll vs. stiffness.

According to the invention the damping rate of the damper 1 is arranged to be relatively high for small amounts of wheel travel to either side of the central level position, and then to decrease at higher levels of articulation. The dimensions of the passage 25 are a factor determining the damping rate of the damper 1: the greater the effective cross sectional area of the passage 25, the lower the damping will be. Thus, according to one embodiment of the invention as shown on the right hand side of FIG. 3, the outer edge of the annular aperture 20b has a section of decreased radius centered in the middle around the bleed port 29 so as the rotor blade 19b moves beyond it to the wider radius part of the aperture 20b, the passage 25 widens. Therefore the damper 1 presents a relatively high resistance to axle or vehicle roll at low angles of axle articulation, but reduced resistance at higher angles. Referring to FIG. 4, the resistance provided by the damper 1 is at a significant high level up to a 2° of axle articulation, falls off to a much lower level between about 2° and 3° of axle articulation, and remains at the lower level at higher articulations. The damping, i.e. the resistance to roll for a given rate of change of articulation angle, is higher in the central region when the body is moving away from the horizontal than when it is returning. This is because on the return the bleed port 29 will allow some escape of hydraulic fluid from the higher pressure chamber 52 or 54, whereas during movements away from the centre the bleed port 29 will allow fluid leakage into the lower pressure chamber, which has less effect on the damping rate. However, because of the central positioning of the bleed port 29, the damping rate is symmetrical about the central position of the rotor, i.e. about the level condition of the vehicle. It will be appreciated that the shape of the passage 25 can be made to change in various ways during changes in articulation angle by adaptation of the aperture surface 20, for example several incremental increases or decreases in resistance could be provided.

A further method of decreasing the damping as the rotors move away from the central position is to form one or more grooves in the sides of the rotor plates 19 having one end opening into the cavity 50 near the centre, close to the bleed port 29 and the other end opening into the end of one of the chambers 52, 54. Such grooves would, together with the side plates 18a, form passages which would be opened up as the rotor plates 19 moved away from the central position providing further interconnection between the two chambers 52, 54. In order for the system to be symmetrical the same number of grooves would need to be formed for each of the chambers 52, 54.

Another method of varying the damping with articulation is to alter the viscosity of the fluid within the cavity 50 which would allow significant control of the damper performance. One approach to controlling the varying viscosity is to provide a fluid within the recess which has an electrorheological or magnetorheological performance. Such fluids have a dramatic variation in their viscosity when an electrical or magnetic field is applied to them. In the present invention, three potential uses for such electrorheological or magnetorheological fluids are readily apparent. Firstly, the entire volume of the cavity 12 can be subjected to an electrical or magnetic field in order to alter the fluid held therein and so change the damper performance. Flow through the passage 25 or 32 can be inhibited by applying an electrical field to these portions of the fluid only and so change the damper performance. Finally, the port 29 could be essentially closed by applying an electrical field or magnetic field and so inhibiting leakage of fluid along with air/gas purge from the recess with the result that damper performance is marginally altered. All of these are ways of controlling the damping and can be used, together with articulation sensors and control means, to change the damping with articulation.

A further approach to altering the damping rate during operation is to provide a bypass route for fluid between the operational chambers 52, 54 as shown in the left hand side of FIG. 3. With this embodiment a bypass port 33, 34 is provided at the ends of each cavity 50. These bypass ports 33, 34 are connected via appropriate piping 60 and a valve 62. Thus, when the valve 62 is open a bypass route for fluid other than through the passage 25, 32 is provided thereby reducing resistance to movement of the rotor plates 19 relative to the stator plates 18 and therefore to relative vertical motion between the wheels 6 coupled respectively to the stator member 10 through stator plates 18 and rotor member 11 through rotor plates 19. The valve can be a simple open and shut arrangement or provide for gradual variation in the rate of bypass flow and so alteration in the resistant force provided. Alternatively several valves could be provided which would open up a series of passages in increasing number as the rotor plates moved away from the central position. Typically, the valve will be solenoid operated to provide for remote control. Furthermore, the valve could provide pressure relief protection.

In the embodiments depicted a multiplicity of thin metal plates are utilized to form the multiplicity of working chambers of the stator and the blades of the rotor. However, it will be appreciated that by appropriate extrusion or sintering with subsequent machining and welding processes integral stator and rotor components could be manufactured with a high degree of tolerance. In this case the chambers would be much longer in the axial direction and probably only one pair of chambers would be used. However the advantage of the use of plates is that they may be stamped to provide the appropriate configurations, and the production costs, particularly of only small numbers are to be produced, are relatively low.

We claim:

1. A roll damper apparatus for a motor vehicle having two wheels on opposite sides thereof, the apparatus comprising a first member defining a cavity and a second member located within said cavity to divide the cavity into two chambers, wherein at least one passage is defined between the chambers, the cavity contains fluid, and the first and second members are connected between said wheels such that roll of the vehicle will cause movement of the second member relative to the first, such movement being damped by the flow of fluid through said at least one passage, the second member having a central position corresponding to a level condition of the wheels, and said at least one passage being arranged to increase in effective cross sectional area as the second member moves to either side of the central position such that roll damping is at a relatively high level, for low roll angles to either side of the level condition of the wheel, and the roll damping decreases to a lower level for higher roll angles to either side of the level condition.

2. An apparatus according to claim 1 wherein the first and second members comprise a stator and a rotor respectively connected between said two wheels such that vehicle roll will cause rotation of the rotor relative to the stator.

3. An apparatus according to claim 1 wherein said at least one passage includes a passage formed as a gap between the first and second members, and the first and second members are shaped such that the gap increases in cross sectional area as the second member moves to either side of the central position.

4. An apparatus according to claim 1 further comprising valve means wherein the valve means are arranged to increases the effective cross sectional area of said at least one passage as the second member moves to either side of the central position.

5. An apparatus according to claim 1 wherein the second member has a range of movement and said effective cross sectional area is arranged to be constant over a part of said range of movement centred on the central position.

6. An apparatus according to claim 2 further comprising an anti-roll torsion bar connected between said wheels so as to produce torsional resistance to roll of the vehicle, wherein the rotor and stator are mounted around the torsion bar and connected to the wheels via connecting means so that they provide damping resistance to vehicle roll in parallel to the torsional resistance of the torsion bar.

7. Apparatus according to claim 6 wherein the connecting means is substantially rigid.

8. Apparatus according to claim 6 wherein the connecting means is flexible so as to provide resilient resistance to roll in parallel with that provided by the torsion bar.

9. A roll damper apparatus for a motor vehicle having two wheels on opposite sides thereof movable into and out of a level condition, the apparatus comprising a first member defining a cavity and a second member located within said cavity to divide the cavity into two chambers, wherein a passage is defined between the chambers, the cavity contains fluid, and the first and second members are connected between the wheels such that vehicle roll will cause movement of the second member relative to the first, such movement being damped by the flow of fluid through the passage, the second member having a central position corresponding to the level condition of the wheels, wherein the first member at least partly defines a bleed path arranged to allow bleeding of at least one of fluid and air out of the cavity during movement of the second member relative to the first member, the bleed path opening into the cavity at a point aligned with the central position of the second member.

10. Apparatus according to claim 9 wherein the first and second members comprise a stator and a rotor respectively connected between said two wheels such that vehicle roll will cause rotation of the rotor relative to the stator.

11. Apparatus according to claim 10 wherein the passage is defined between the rotor and the stator.

12. Apparatus according to claim 11 wherein rotor has a radially outer end and the passage is defined between said radially outer end and the stator.

13. A roll damper apparatus for a motor vehicle having two wheels on opposite sides thereof, the apparatus comprising a plurality of stator members each at least partly defining a respective cavity and a plurality of rotor members each located within a respective one of said cavities to divide it into a pair of chambers, wherein a passage is defined between each pair of chambers, the cavities contain fluid, and the rotor and stator members are connected to said wheels such that vehicle roll will cause movement of the rotors relative to the stators, such movement being damped by the flow of fluid through the passages, wherein the apparatus further comprises support members and a spring and the rotor and stator members comprise plates slidably mounted on the support members and clamped in position by means of the spring.

14. Apparatus according to claim 13 further comprising at least one side plate member arranged between the stator members to cooperate therewith to define the chambers.

15. Apparatus according to claim 13 wherein the support members comprises a stator housing member on which the stator members are mounted and a rotor housing member on which the rotor members are mounted.

16. Apparatus according to claim 15 wherein the stator housing member and the rotor housing member together define a volume which is divided up by the plate members to form the cavities and the chambers.

17. Apparatus according to claim 16 wherein the volume has an outer wall formed by the stator housing member and an inner wall formed by the rotor housing member.

18. Apparatus according to claim 17 wherein the stator members are supported on splines on the outer wall and the rotor members are mounted on splines on the inner wall.

19. Apparatus according to claim 13 wherein the stator members have aligned apertures therethrough which together define a bleed passage allowing the flow of fluid or air to or from the cavities.

20. Apparatus according to claim 19 wherein the stator members further define a bleed port connecting each of the cavities to the bleed passage.

21. Apparatus according to claim 14 wherein the stator members and said at least one side plate member have aligned apertures therethrough which together define a bleed passage allowing the flow of fluid or air to or from the cavities.

* * * * *